Nov. 22, 1938.   W. KRÄMER   2,137,878
DIRECT-CURRENT MEASURING MEANS
Filed July 19, 1937     2 Sheets—Sheet 1
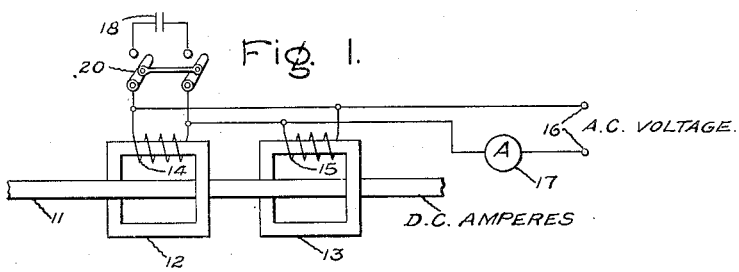
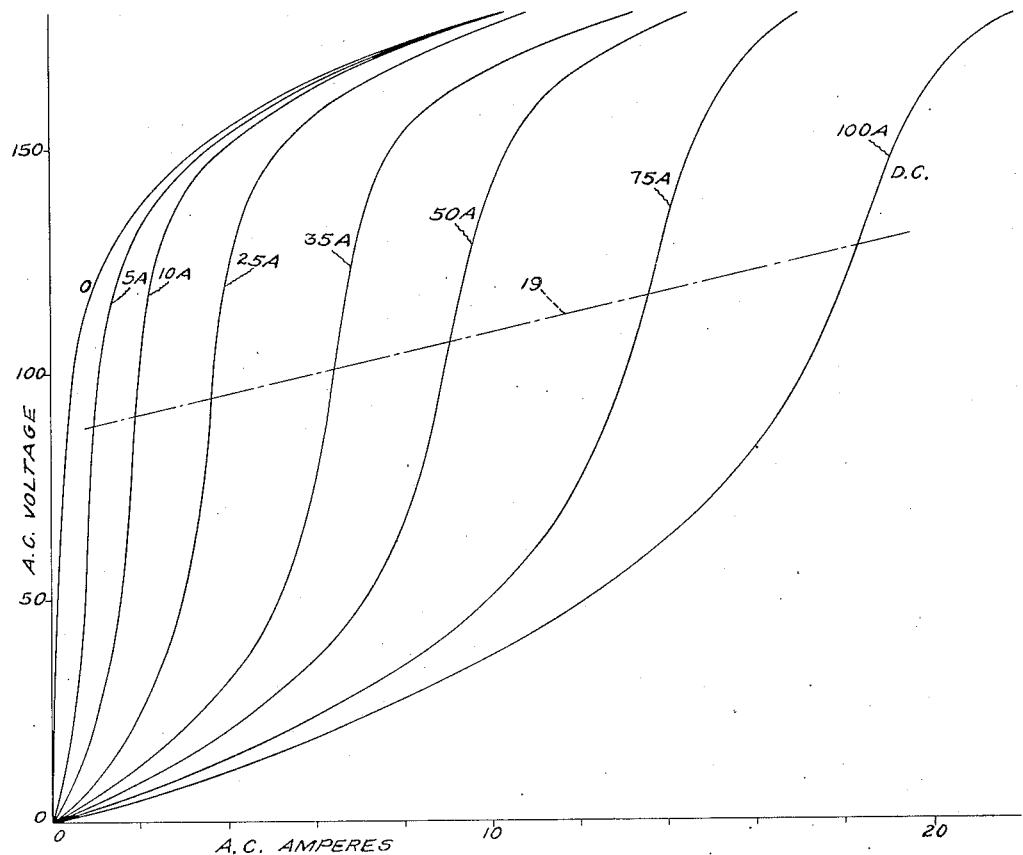
Inventor:
Werner Krämer,
by Harry E. Dunham
His Attorney.

Inventor:
Werner Krämer,
by Harry E. Dunham
His Attorney.

Patented Nov. 22, 1938

2,137,878

UNITED STATES PATENT OFFICE 2,137,878

DIRECT-CURRENT MEASURING MEANS

Werner Krämer, Berlin-Karlshorst, Germany, assignor to General Electric Company, a corporation of New York Application July 19, 1937, Serial No. 154,503
In Germany October 7, 1936

4 Claims. (Cl. 171—95)

My invention relates to current-responsive apparatus and particularly to apparatus for measuring direct-currents.

It is an object of my invention to provide a direct-current transformer, that is, a device which may be used for measuring direct current without actual or conductive connection with the circuit in which the current is to be measured. Such devices are of value, for example, either when the current to be measured is beyond the range of any suitable measuring instrument or it is desirable to be able to insulate the measuring instrument from the circuit in which the current is to be measured owing to the presence of dangerously high voltage in the main circuit.

It is an object of my invention to produce a relatively accurate arrangement for measuring direct current by the effect of the direct current on the alternating current impedance of an iron core choke coil subjected to unidirectional magnetization by the direct current to be measured.

It is a further object of my invention to minimize errors resulting from variations in voltage and frequency of the alternating-current auxiliary circuit used in connection with such apparatus. It is a further object of my invention to obtain these advantages without sacrificing simplicity of structure and circuit.

It is also an object of my invention to provide apparatus for measuring extremely high direct-current intensities without hysteresis errors.

Other and further objects and advantages will become apparent as the description proceeds.

In carrying out my invention in its preferred form, I provide a closed core of magnetic material, such as a relatively permeable alloy of iron or other suitable materials. The core is provided with a direct-current winding which may be a single bar passing through the core carrying the direct current to be measured. The core is also provided with an alternating-current winding energized from an alternating-current source having an alternating-current measuring instrument in series therewith. The pressure of the alternating-current source is so chosen that the alternating-current magnetic induction of the core comes within the range of the point of inflection of the alternating current magnetization curve, which is obtained with unidirectional magnetization of the core due to the effect of the direct current being measured.

Figure 3:
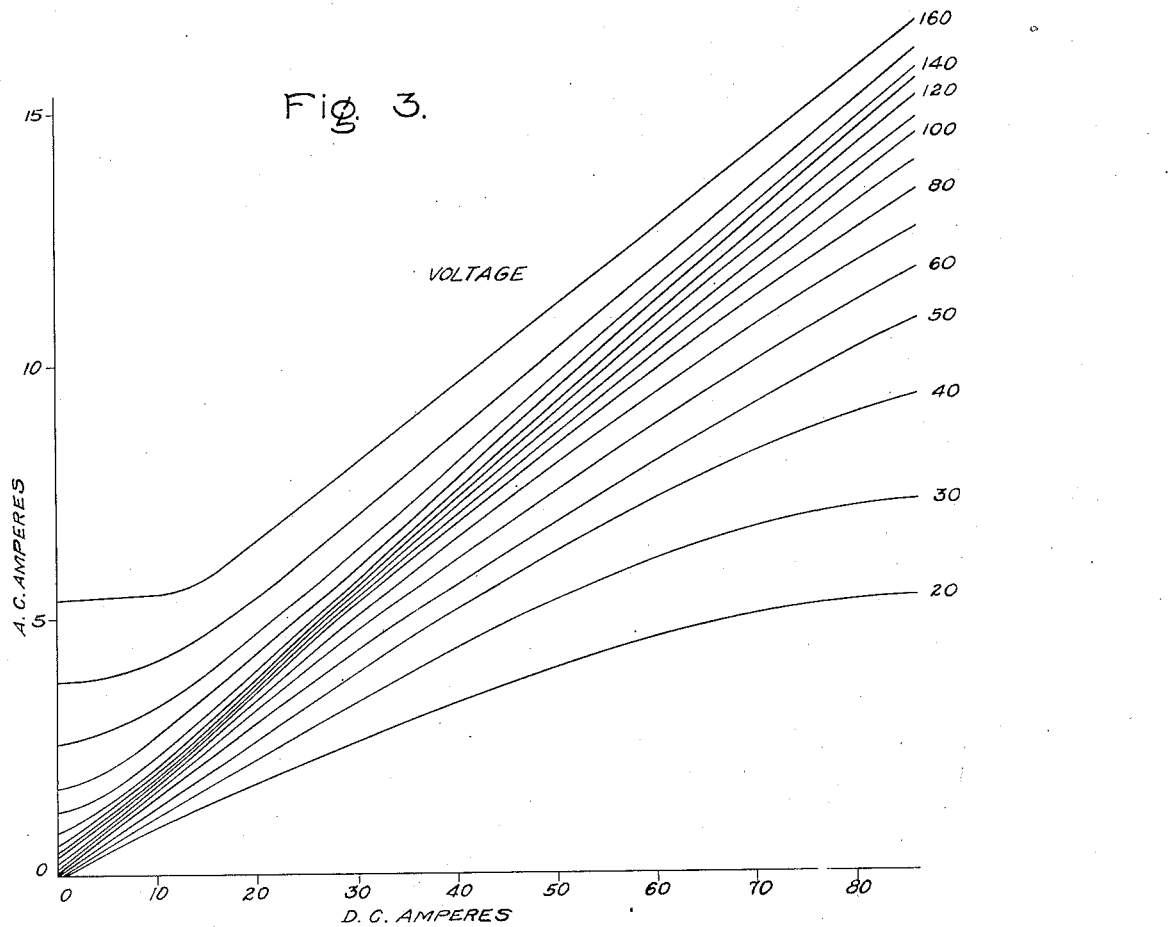
Figure 4:
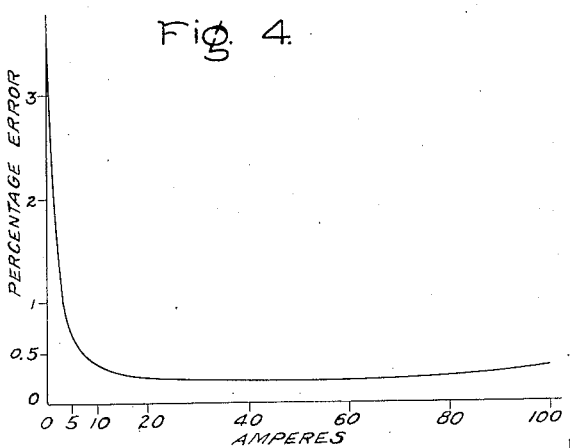
Figure 5:
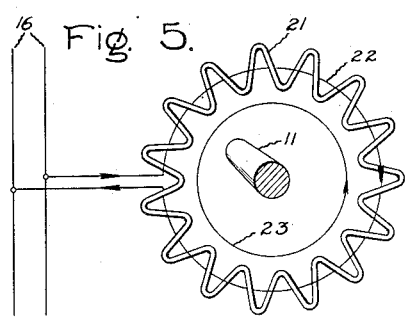

The invention may be understood more readily from the following detailed description when considered in connection with the accompanying drawings and those features of the invention which are believed to be novel and patentable will be pointed out in the claims appended hereto. In the drawings, Fig. 1 is a schematic diagram of one embodiment of my invention; Fig. 2 is a graph illustrating the relationship between the induced or applied alternating voltage and the alternating current flowing in the alternating-current windings for different values of current in the direct-current winding; Fig. 3 is a graph showing the relationship between the alternating current in the alternating-current winding and the direct current in the direct-current winding for various values of alternating-current magnetization, that is, for various values of alternating voltage of the alternating-current winding; Fig. 4 is a graph illustrating the errors in reading which may be obtained for various values of measured current due to deviations of one per cent in the voltage or frequency of the alternating-current auxiliary circuit, and Fig. 5 is a schematic diagram of another embodiment of the invention for use particularly in connection with the measurement of extremely high currents. Like reference characters are utilized throughout the drawings to designate like parts.

Referring more in detail to the arrangement shown in Fig. 1, while only one core may be used, in this instance, I have provided two magnetic cores with oppositely wound alternating-current windings in order to obviate alternating-current induction in the direct-current circuit. The direct-current winding is represented by a single bar 11 passing through and linking the two closed magnetic cores 12 and 13. The magnetic cores 12 and 13 are provided also with alternating-current windings 14 and 15, respectively, reversely connected so as to have opposite effects on the cores 12 and 13. The windings 14 and 15 are connected to a source of alternating current 16, and an alternating-current ammeter or other current-responsive measuring instrument 17 is connected in the circuit. In the arrangement shown, the windings 14 and 15 are in parallel. If desired, in connection with the measurement of extremely high currents, a condenser 18 may also be connected in the alternating-current circuit in order to improve the power factor and thereby decrease the burden of the alternating-current circuit. The purpose of the arrangement is to measure direct current in bar 11 by the reading of ammeter A and the invention pertains to the proper A. C. magnetization of the transformer core for accurate results.

It has been found that the relationship between voltage plotted in the vertical direction and current plotted in the horizontal direction in the alternating-current circuit of Fig. 1 without condenser 18 connected is as shown in Fig. 2 wherein the various curves represent the variation in the alternating-current magnetization curves for various values of unidirectional magnetization of the core produced by the values of direct current in the bar 11 designated by the numerals adjacent the successive curves. Thus, at 100 volts A. C., about ½ ampere flows in meter A when there is no D. C. current in bar 11 and about 4 amperes flow in meter A when 25 amperes D. C. flow in bar 11. It will be understood, of course, that the numerical values of current and voltage depend upon the number of turns, dimensions, etc., of the electrical and magnetic elements.

The dotted line 19 is drawn through the points of inflection of the curves of Fig. 2, that is, through the points of maximum slope or greatest steepness. It will be seen that the line 19 is substantially a straight line. In normal ferrosilicon alloy, the line 19 lies between values corresponding to the range between ten and thirteen thousand gausses alternating-current induction in the cores 12 and 13. Although the horizontal ordinate is plotted in terms of the alternating-current circuit, it will be understood, of course, that the voltage is proportional to the flux strength or magnetization and, therefore, the voltage values represent magnetization in gausses. The ratio of alternating-current ampere turns to direct-current ampere turns is found to be nearly constant at 1.1.

In Fig. 3 are shown calibration curves of current in the alternating-current winding plotted in a vertical direction with respect to current in the direct-current winding plotted in the horizontal direction for various values of applied voltage in the alternating current circuit, that is, for various values of alternating magnetization or induction. It will be seen that the curves in Fig. 3 which are substantially linear are those which lie within the alternating voltage range from ninety to one hundred and twenty volts in the apparatus described, corresponding to the alternating induction range between ten thousand and thirteen thousand gausses. It will be understood that the relationship between magnetic flux and voltage in any particular apparatus depends upon its electrical dimensions.

Furthermore, the differences between these substantially linear curves, which correspond to the measuring errors in voltage difference existing between the parameters of the curves, are relatively small compared with the differences between the remaining curves. In a similar manner, changes in frequency and changes in load will have relatively little effect within this range between ten thousand and thirteen thousand gausses, which corresponds to the range of points of inflection in the curves of Fig. 2.

Fig. 4 is an accuracy curve for various values of measured direct current. The percentage error of the measuring instrument 17 when calibrated in D. C. amperes is plotted in a vertical direction for various values of the actual current flowing in the bar 11 plotted in the horizontal direction when a deviation of one per cent takes place in the voltage or the frequency of the alternating-current auxiliary circuit 16. It will be seen that, in the greatest part of the measuring range, this error is only twenty-five hundredths of a per cent or only one-fourth the deviation of the voltage or frequency applied to the auxiliary circuit 16. The curve of Fig. 4 represents graphically the equation:

$$F_E = \frac{dI}{dV} \times \frac{V}{I} \times \%$$

where $F_E$ represents the error of the instrument reading, I and V represent current and voltage, respectively, in the alternating-current circuit, and $$\frac{dI}{kV}$$

is the rate of change of the current, I, with respect to changes in the voltage, V.

In case the apparatus is utilized for measuring currents of such magnitude as to require comparatively high alternating-current induction, the higher apparent power required can be compensated for by means of the condensr 18, in which case, the switch 20 would be closed and a different calibration of the apparatus used.

In case there is a ripple in the direct current, the transformer which I have described measures the pure direct-current component, that is, the mean value of the current since, as explained in connection with Fig. 1, the compensating current of the harmonic wave consisting of alternating-current components flows in the alternating-current windings of the transformer.

The form of transformer shown in Fig. 1 has been found to be suitable for measurement of values of direct current as high as twelve thousand amperes, for example. It will be understood that for measuring twelve thousand amperes, the electrical dimensions will be different than in the case of the apparatus described in connection with the drawings. For measuring small direct currents with such apparatus, it is desirable to employ highly permeable magnetic material, such as certain nickel iron alloys, for instance, which are well known to those skilled in the art for use where high permeability is required.

In connection with the measurement of exceptionally high direct currents, in order to avoid excessively large core diameters and excessive amounts of copper or of copper loss in the alternating-current windings, the iron core may be constructed in the manner illustrated in Fig. 5. In the arrangement of Fig. 5, the core consists of bands of tape or wire rope of iron or high permeability material wound to form an annular spiral 21 encircling an alternating-current coil 22 which surrounds concentrically the direct-current conductor or bar 11. In order to compensate for leakage values of the alternating-current coil, the concentric damping ring 23 of conducting material may be provided.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:

1. An induction measuring system for direct-current comprising in combination, a core of magnetizable material, a direct-current winding linking said core, an alternating-current winding linking said core, a source of alternating-current connected to said alternating-current winding, and a current responsive device in circuit with said alternating-current winding, the voltage of the alternating-current source being of such magnitude as to come within the range of the inflection points of the alternating-current magnetization curves obtained by unidirectional magnetization of the core at different values due to current in the direct-current winding.

2. An induction measuring system for direct-current comprising a core of highly permeable magnetizable material, a direct-current winding linking said core, an alternating-current winding linking said core, a source of alterating current connected to said alternating-current winding, and a current measuring device in circuit with said alternating-current winding, the voltage of the atlernating-current source being of such magnitude as to come within the range of the inflection points of the alternating-current magnetization curves obtained by unidirectional magnetization at different values due to current in the direct-current winding.

3. An induction measuring system for direct-current comprising a core of magnetizable material, direct and alternating-current windings in inductive relation thereto, a condenser, a source of alternating current energizing said alternating-current winding and said condenser, and a current responsive device in circuit with said alternating-current circuit, the voltage of said alterating-current circuit being of such magnitude as to produce alternating magnetization of the core coming within the range of the inflection point obtained by unidirectional magnetization due to current in the direct-current winding.

4. An induction measuring system for direct-current comprising a direct-current winding in the form of a bar, an alternating-current coil surrounding said bar, a core of magnetizable material in the form of an annular spiral surrounding said alternating-current coil, a damping winding in the form of a closed conductor surrounding said bar but not linking said annular spiral core, and a source of alternating-current energizing said coil.

WERNER KRÄMER.